Aug. 2, 1938.  W. C. CONOVER  2,125,270
SLIP CLUTCH DEVICE
Filed Sept. 22, 1937
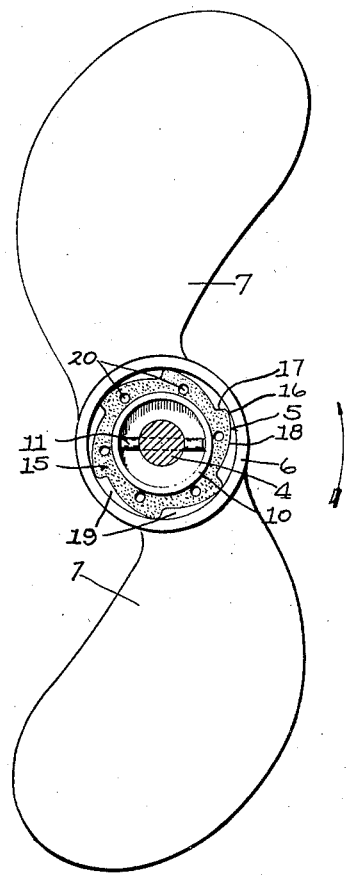
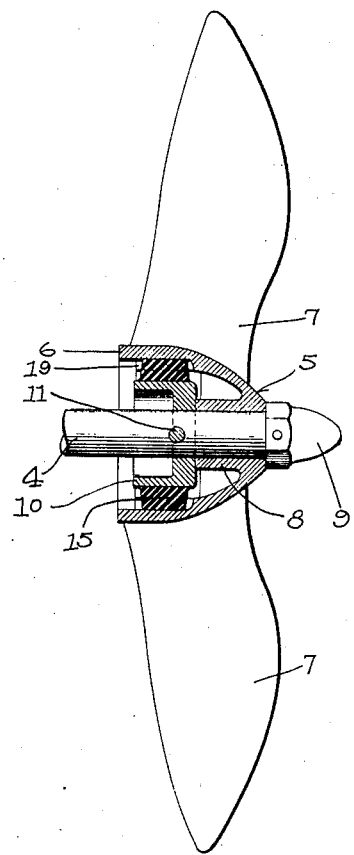
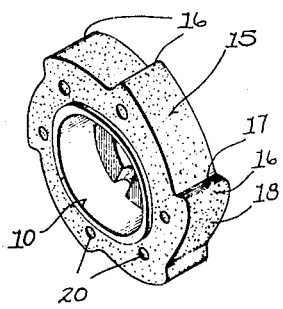
INVENTOR
Warren C. Conover,
BY
Wheeler, Wheeler + Wheeler
ATTORNEYS Patented Aug. 2, 1938

2,125,270

UNITED STATES PATENT OFFICE 2,125,270

SLIP CLUTCH DEVICE

Warren C. Conover, Waukegan, Ill., assignor to Outboard Marine & Manufacturing Company, Waukegan, Ill., a corporation of Delaware Application September 22, 1937, Serial No. 165,038

4 Claims. (Cl. 64—30)

This invention relates to improvements in slip clutch devices, with particular relation to propeller driving connections.

It is the primary objects of the invention to provide means for utilizing a deformable rubber block as a means for transmitting sufficient power to drive a marine propeller through a block housed in the hub thereof without overloading the block to such an extent as to cause the destruction thereof. I seek to obtain this objective by making the inner periphery of the block fast to the driving element and locating the deformable slip clutch connection between the block and the driven element at the outer periphery of the block where the stresses to which the block are subject in the transmission of a given amount of torque are at a normal.

In the drawing:

Figure 1 is a view of a mounted propeller as it appears in elevation looking aft, the drive shaft being shown in section.

Figure 2 is a view of the propeller shaft, the hub, and driving connections in axial section.

Figure 3 is an enlarged detail view of the torque transmitting block.

Like parts are designated by the same reference characters throughout the several views.

It will be understood that the propeller is chosen to exemplify the application of this invention. The principle herein disclosed may be applied between other driving and driven parts. For the purposes of this disclosure the propeller shaft 4 constitutes the driving element and the propeller generically designated at 5 and having a hub portion 6 and blades 7 constitutes the driven element.

In the present device the propeller hub has a sleeve portion 8 which is journaled on the shaft, being retained thereon by nut 9 and free to rotate on the shaft subject to its connection with the shaft by the means hereinafter to be described.

The means for transmitting torque from the driving shaft 4 to the driven hub 6 includes the cup-shaped annulus 10, which for the purposes of the present invention, is provided internally with a transverse notch to engage the shear pin 11. When the cup-shaped driving annulus 10 is held in engagement with the shear pin by the sleeve 8 and nut 9, such annulus will be positively keyed to rotate with the propeller shaft 4.

Vulcanized, cemented, or otherwise secured to the periphery of the driving annulus 10, is the torque transmitting block 15 which is shown in enlarged perspective in Fig. 3. The periphery of this block is preferably provided with teeth 16 which may conveniently be formed like ratchet teeth with an abrupt shoulder 17 and an inclined face at 18.

The interior of the hub 6 constituting the driven element has complementary teeth 19. The hub and the driving block 15 may be readily engaged in an axial direction by simply sliding the hub over the block from the right as viewed in Fig. 2. The block may, if desired, be perforated with apertures such as those shown at 20 to render it more readily deformable.

The direction of rotation of the propeller shaft is indicated by the arrow in Fig. 1. In the event that the propeller strikes an obstacle or otherwise becomes subject to excessive load, the tendency of the propeller shaft to continue its rotation will occasion a slippage between the rubber torque transmitting block 15 and the complementary teeth 19 of the hub 6. While the rubber block is anchored by vulcanization or otherwise to the driving element in its center, the only connection between its outer periphery and the driven hub element 6 constitutes the irregularity of contour represented by the non-deformable teeth 19 of the driven element and the deformable teeth 16 of the block.

If the obstruction is only temporarily, or in the nature of a vibration, or irregularity of movement either of the driving or driven elements, the elasticity of the rubber block will permit it to yield without any actual slippage occurring between its outer periphery and the inner periphery of the hub. If, however, the resistance is excessive or is prolonged, the block will be deformed sufficiently so that each of its teeth 16 will gradually move from the interdental space in which such teeth are accommodated in Fig. 1, until the teeth are engaged in the next successive interdental space or in some subsequent interdental space in the direction of torque rotation.

When the overload is relieved the rubber block will naturally pick up the torque in any position relative to the hub in which the block happens to be at the time, and the tendency will be for the teeth of the rubber block again to completely fill the interdental spaces between the teeth 19 of the hub. In fact the rubber block need not initially be provided with teeth at all, but it may derive the form shown in Fig. 3 solely by being molded by the interior of the hub, upon introduction therein. In other words, the form of the rubber block may initially be cylindrical and it may be pushed under compression into the hub to fill the available space as shown in Fig. 1.

While the block 15 has been described as being made of rubber, it will be understood that any rubber substitute capable of withstanding the severe requirements can be substituted for ordinary rubber. The word "rubber" is used generically, therefore, to designate ordinary rubber and rubber substitutes.

The characteristics of the rubber are important, and the particular organization is also important. If the toothed connection through the rubber torque transmitting block were located at the inner periphery of the block the form of the teeth would either have to be such as to subject the rubber to excessive stress or the rubber would have to be made so elastic as not to transmit the required amount of power. In order that the rubber may have sufficient resilience and at the same time in order that its composition may be such that it will not be destroyed in ordinary usage, it is important that the driving connections to or from the rubber at which slippage occurs in the deformation of the rubber, should be located at the outer periphery of the block rather than its inner periphery.

The torque transmitting device herein disclosed is particularly adapted for slip clutches for driving marine propellers for the reason that the water in which the device is immersed tends to lubricate the co-acting surfaces of the rubber cushion and the outer member which is in slip connection therewith. Similarly, the invention is applicable to the driving of pump runners operating in liquids suitable for the lubrication of a rubber bearing surface.

It will, of course, be understood that power may be transmitted through this device in either direction and that various changes may be made herein without departing from the principles herein set forth.

I claim:

1. A torque transmission device comprising inner and outer driving and driven motion transmitting elements, and a driving connection therebetween comprising an elastically deformable cushion fixed with reference to the inner of said elements and having its periphery in slipping connection with the outer of said elements, said outer element having teeth engaging complementary portions of the periphery of said member to deform said member upon relative movement between said elements.

2. The combination with inner and outer elements, of a resiliently elastic cushion having means fixing it for rotation with the inner of said elements, the outer periphery of said cushion being in slip connection with the inner periphery of the outer of said elements, the said inner periphery having teeth presenting relatively abrupt shoulders toward one direction of rotation and inclined faces toward the other direction of rotation, and said cushion filling the space within and about said teeth, whereby relative movement between said elements will result in the deformation of the cushion in the course of slippage between the cushion and the outer element.

3. In a device of the character described, the combination with an inner driving element and an outer driven element, of an annulus on the inner element, a cushion vulcanized to the exterior periphery of said annulus, and a toothed inner periphery in the outer element with which said cushion is engaged under compression, whereby said cushion fills the spaces between the teeth of said element, said cushion being in slipable connection with the toothed surface of the outer element upon deformation of its periphery by said teeth, said cushion being sufficiently resiliently elastic to tend to maintain its form and constituting relatively incompressible material of sufficient body to transmit required torque from the driving to the driven element.

4. In a device of the character described, the combination with a driving shaft, of an annulus mounted thereon, a generally annular cushion mounted on the outer periphery of said annulus and provided with means securely fastening it through said annulus to said shaft, a driven member on said shaft free to rotate thereon, save for its connection with said shaft through the cushion, said driven member having a hub portion engaged about the periphery of said cushion, and the cushion and the hub portion having complementary teeth in interlocking relation and constituting the sole connection between the cushion and said hub portion, the cushion being sufficiently resiliently elastic to be deformable upon the slippage of its outer periphery with respect to said hub portion under excessive load but adapted to transmit without injury to the cushion the intended torque for the driving of said hub portion from said shaft.

WARREN C. CONOVER.